United States Patent [19]

Cross, Jr.

[11] 4,396,006

[45] Aug. 2, 1983

[54] SOLAR POWERED, SOLAR AIMING DEVICE

[76] Inventor: Roger H. Cross, Jr., 927 Erie Station Rd., Rush, N.Y. 14543

[21] Appl. No.: 310,787

[22] Filed: Oct. 13, 1981

[51] Int. Cl.³ .............................................. F24J 3/02
[52] U.S. Cl. .............................. 126/425; 250/491.1; 353/3
[58] Field of Search .............................. 126/424, 425; 250/203 R, 491; 353/3

[56] References Cited

U.S. PATENT DOCUMENTS

| | | | |
|---|---|---|---|
| 1,976,428 | 10/1934 | Arthuys | 353/3 |
| 4,027,651 | 6/1977 | Robbins | 126/425 |
| 4,063,543 | 12/1977 | Hedger | 353/3 |
| 4,122,827 | 10/1978 | Rhodes | 353/3 |
| 4,185,615 | 1/1980 | Bottom | 126/424 |
| 4,198,954 | 4/1980 | Meijer | 126/425 |
| 4,275,712 | 6/1981 | Baer | 353/3 |
| 4,276,122 | 6/1981 | Snyder | 126/425 |
| 4,305,380 | 12/1981 | Allen | 126/425 |
| 4,306,541 | 12/1981 | Morrison | 353/3 |
| 4,328,789 | 5/1982 | Nelson | 250/491 |

Primary Examiner—Daniel J. O'Connor
Attorney, Agent, or Firm—Stonebraker, Shepard & Stephens

[57] ABSTRACT

A solar powered, solar aiming device pivotally mounted on a base 40 uses a pair of separate solar sensor panels 11 and 12 that are insulated from each other and oriented at an angle to each other. Hydraulics angularly pivot the sensor panels relative to the base in response to pressure produced by sunlight shining on sensor tubes 13 and 14 arranged within the sensor panels to contain refrigerant material. The refrigerant communicates with and pressurizes a pair of bladder separators 21 and 22 that separate the refrigerant from hydraulic material operating the hydraulic pivoter. Sensor tubes 11 and 12, separators 21 and 22, and the hydraulics are arranged so that when an aiming plane 18 bisecting the angle between the sensor panels is aimed at an angle from the sun thus causing the sensor tubes to receive different incident sunlight and reach different temperatures, the refrigerant material applies different pressures to the respective separators which in turn power the hydraulic means to pivot the sensor panels and correct the solar aim of bisector plane 18. The device can be used to aim a solar energy collector or other solar device oriented perpendicular to the aiming plane between the sensor panels.

11 Claims, 3 Drawing Figures

SOLAR POWERED, SOLAR AIMING DEVICE

BACKGROUND

Solar energy collectors are known to be much more efficient if aimed to track the sun. Accomplishing this has been cumbersome and expensive, though. It requires a mechanical mounting that allows solar energy collectors to pivot, a power supply for moving the collectors, and a control system for insuring that the movement tracks the sun reasonably accurately. The cost and difficulty of meeting these requirements have practically limited most solar collectors to stationary positions that are less efficient.

My invention suggests a solar powered aiming device that draws both the necessary power and the aiming control from the sun itself and uses this in a simple, low cost, and effective way for aiming continuously at the sun. My device attains automatic and reliable operation without human intervention and without a separate source of power so that the sun itself supplies all that is needed for a solar aiming device.

SUMMARY OF THE INVENTION

My solar powered, solar aiming device is pivotally mounted on a base and uses a pair of separate solar sensor tubes that are insulated from each other and oriented at an angle to each other. It includes hydraulic means for angularly pivoting the sensor tubes relative to the base in response to pressure produced by sunlight shining on the sensor tubes. These contain refrigerant material communicating with a pair of bladder separators that separate the refrigerant from hydraulic material operating the hydraulic pivoter, so that solar energy respectively incident on the sensor tubes pressurizes the separators and the hydraulic material.

These components are arranged so that when an aiming plane bisecting the angle between the sensor tubes is aimed at an angle from the sun, causing the sensor tubes to receive different incident sunlight and reach different temperatures, the refrigerant material applies different pressures to the respective separators which then power the hydraulics to pivot the sensor tubes to correct the solar aim of the bisector plane. Conversely, when the bisector plane is aimed at the sun, causing the sensor tubes to reach approximately equal temperatures, the refrigerant material applies approximately equal pressures to the respective separators, which then hold the hydraulics stationary.

DRAWINGS

DETAILED DESCRIPTION

The drawings show a preferred arrangement of components that work together to form a solar powered, solar aiming device according to my invention. These components include a pair of sensor panels 11 and 12, a pair of hydraulic bladder separators 21 and 22, and a pair of hydraulic cylinders 31 and 32, all arranged to respond to sunlight for powering and aiming the device. Many variations in these components are possible according to the invention as explained below.

Figure 1:
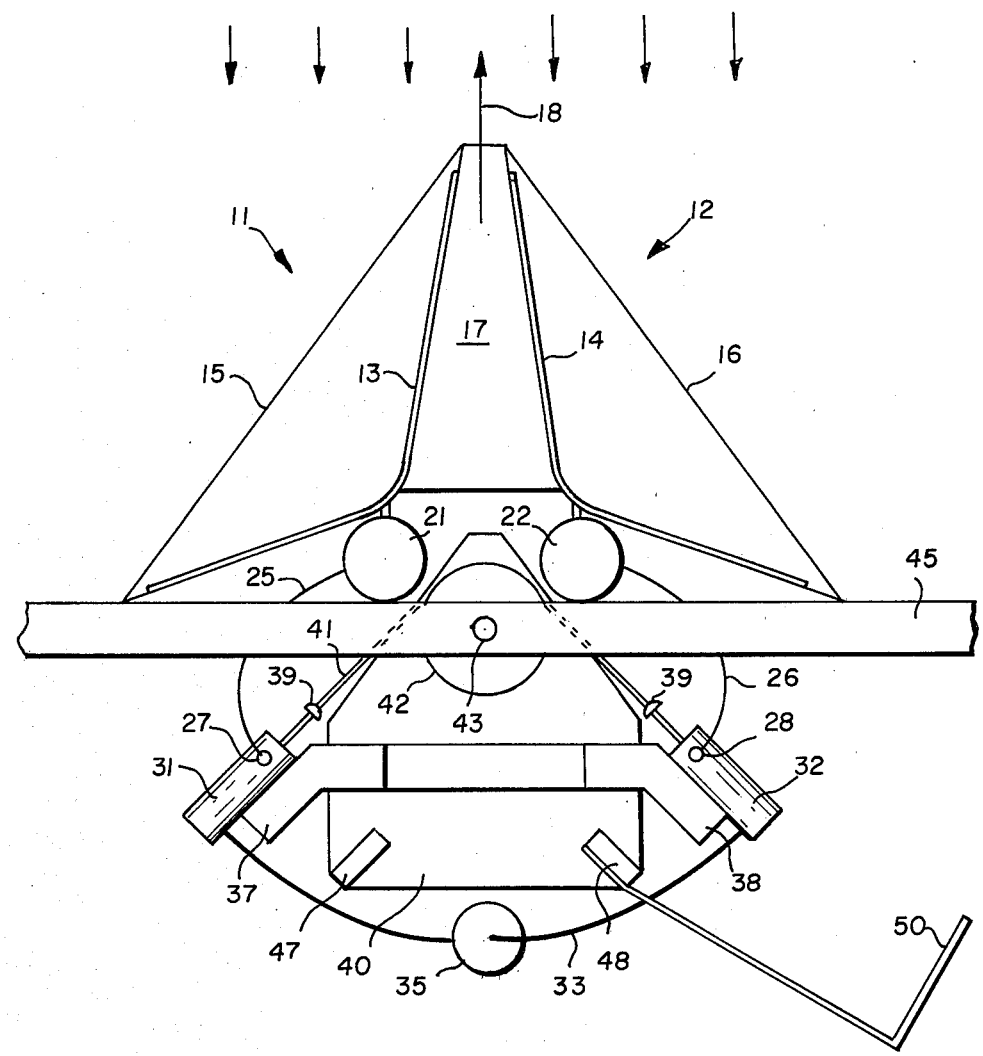
FIG. 1 is a partially schematic, fragmentary plan view of a preferred embodiment of my solar powered, solar aiming device.
Figure 2:
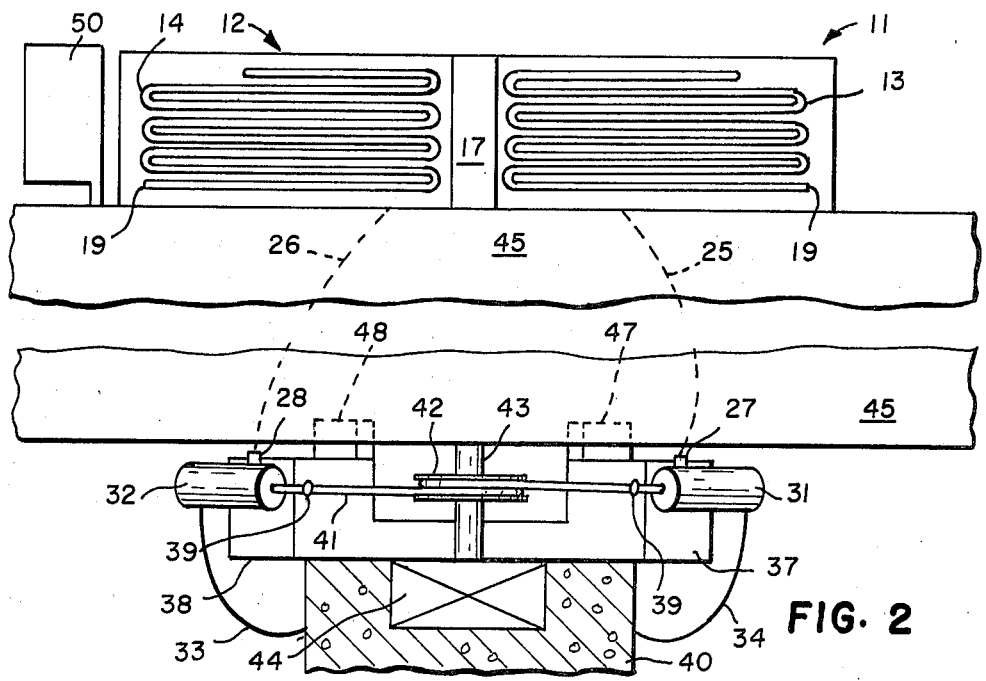
FIG. 2 is a partially schematic, fragmentary elevational view of the sunny side of the device of FIG. 1.
Figure 3:
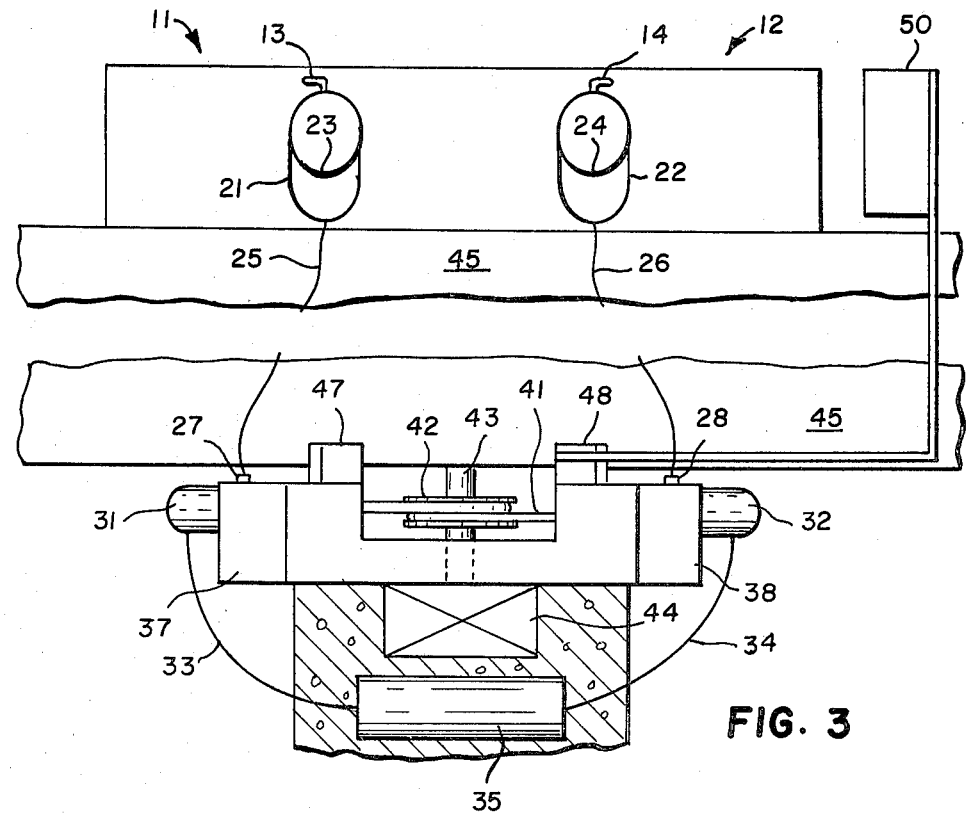
FIG. 3 is a partially schematic, fragmentary elevational view of the shady side of the device of FIG. 1.

First, the solar sensor panels 11 and 12 are separate and insulated from each other and oriented at an angle to each other as illustrated. Panels 11 and 12 include respective sensor tubes 13 and 14 preferably formed of copper that is blackened to collect solar energy. Tubes 13 and 14 are arranged in patterns that are angled to each other and are suitably disposed for receiving incident radiation from the sun; and in the preferred arrangement illustrated, tubes 13 and 14 are bent into a zigzag path that forms a large surface area. The zigzag portions of tubes 13 and 14 are also formed in a concave configuration as best shown in FIG. 1, and the main reason for this is to widen the solar angle of view of each tube for receiving solar radiation. This helps the morning sun be effectively incident on the eastern sensor tube 13 when the device is pointed westward from following the previous day's sun, for example. Tubes 13 and 14 can also be arranged in flat planes and convex shapes; they can be spiraled instead of zigzagged and can be laid out in other ways for effectively receiving incident sunlight.

Glazing 15 and 16, preferably formed of glass, encloses sensor tubes 13 and 14 to make them more effective at receiving solar energy and to reduce wind chill effects. Just as the sensor tubes 13 and 14 can be arranged in many different configurations, glazing 15 and 16 can also have different shapes and be formed of different materials. One possibility is a blister-shaped glazing that collects a wider angle of sunlight, and another possibility is an optical glazing that directs small incidence angle sunlight inward against tubes 13 and 14.

Sensor panels 11 and 12 can be spaced widely apart or close together as illustrated; but they are thermally insulated from each other, either by distance or by a thermal insulation material 17 arranged between them.

The general orientation of sensor panels 11 and 12 is at an angle to each other, and the angle is preferably acute as shown in FIG. 1. This angular orientation refers to the angle of view from which sensor panels 11 and 12 can receive incident sunlight, and the respective solar angles of view of panels 11 and 12 are angled from each other and preferably overlap in the direction of aim toward the sun. Another way of expressing this is that sensor panels 11 and 12 are oriented along opposite sides of an arrowhead that aims at the sun and is preferably pointed or acute angled, rather than blunt. A plane 18 that bisects the angle between sensor panels 11 and 12 serves as an aiming plane that is directed toward the sun, and panels 11 and 12 are acutely angled to plane 18 and disposed on opposite sides of plane 18 as illustrated.

Bladder separators 21 and 22 correspond with each of the panels 11 and 12, and one end of each of the sensor tubes 13 and 14 is coupled to respective bladder separators 21 and 22. The opposite ends 19 of tubes 13 and 14 are sealed closed. Separators 21 and 22 have internal bladders 23 and 24 that resemble the bladders in hydraulic accumulators. Separators 21 and 22 are simpler, however, and do not require check valves and other accessories found in accumulators.

Refrigerant material trapped within sensor tubes 13 and 14 communicates with bladders 23 and 24 in separators 21 and 22 to provide solar powered hydraulic pressure. The refrigerant material can be any of the refrigerant materials presently in use, and a suitable quantity of refrigerant is charged within tubes 13 and 14 and separators 21 and 22 so that the refrigerant does not entirely vaporize at the highest expected operating temperature of the device. The refrigerant vapor pressure is then a known function of the temperature attained by sensor tubes 13 and 14 on exposure to incident sunlight.

Flexible hydraulic lines 25 and 26 lead respectively from separators 21 and 22 to hydraulic cylinders 31 and 32. The available space in separators 21 and 22, lines 25 and 26, and cylinders 31 a ' 32 is filled with a conventional hydraulic material such as hydraulic oil. Passive overflow lines 33 and 34 lead from cylinders 31 and 32 to a reservoir 35 of hydraulic material to fill the hydraulic system with oil and eliminate air and moisture.

As increased pressure from refrigerant vapor expands bladders 23 or 24 in separators 21 and 22, this forces hydraulic material out of separators 21 or 22 and into hydraulic cylinders 31 or 32 to accomplish hydraulically powered movement. Bladders 23 and 24 thus separate refrigerant and hydraulic material at a pressure interface that moves as sunlight varies the temperatures of sensor tubes 13 and 14.

Lines 25 and 26 are long enough and flexible enough so that they can accommodate the full scope of rotation of the device. They also preferably include small orifices 27 and 28 arranged to restrict the flow of hydraulic material between separators 21 and 22 and cylinders 31 and 32 so that pivotal movement of the device is necessarily slow. This keeps the hydraulic system from over responding to temporary discontinuities in received solar energy, such as short-lived shadows; and it also helps the hydraulic system hold the device steady against wind force. A rotation of only 15° per hour is adequate to track the sun, but orifices 27 and 28 allow substantially faster pivoting than that so the device can rotate from west to east in response to the morning sun.

Cylinders 31 and 32 are each single-acting hydraulic cylinders that are preferred for simplicity, but a double-acting cylinder or a hydraulically powered rotor can be substituted. Cylinders 31 and 32 are mounted on arms 37 and 38 of base 40. Clevises 39 couple opposite ends of a cable 41 to cylinders 31 and 32, which operate in a push-pull fashion to move cable 41 back and forth. This motion of cable 41 is converted to pivotal motion by wrapping cable 41 around a drum or pulley 42 concentric with a vertical pivot shaft 43. Shaft 43 is vertically supported on base 40 by a bearing 44 and carries both a solar collector 45 and sensor panels 11 and 12 for pivoting together relative to base 40. This brings the pivotal effect back to sensor panels 11 and 12 as explained below.

Base 40 can be formed in many different ways and is sturdy enough to support all the components. Bearing 44 is selected to pivot freely while bearing the full load of a solar collector 45 or other device to be aimed at the sun, together with the solar aiming device. Pivot shaft 43 is preferably vertical for balance and simplicity, and solar collector or device 45 can be supported on shaft 43 in a wide variety of ways. A truss framework (not shown) is one strong and simple way of mounting collector 45 on shaft 43, but other arrangements are possible. Solar device 45 is oriented perpendicular to the bisector plane 18 between sensor panels 11 and 12 so that when plane 18 aims at the sun as intended, device 45 also aims at the sun for maximum efficiency. Other rotors, pulleys, and levers can be substituted for drum 42; and there are many ways that a hydraulic system can cooperate with a mechanical system to produce the desired pivoting.

Panel system 45 is preferably mounted for pivoting a few degrees around a horizontal axis for manual azimuth adjustment to aim the device at the elevation of the sun at different times of the year. Sensor panels 11 and 12 are ordinarily far smaller than an energy collector 45 and are conveniently mounted atop collector 45 directly above base 40. They can also be mounted elsewhere, of course.

A pair of stops 47 and 48 are arranged on base 40 to engage a bottom edge of collector 45 or its supporting framework to limit the extremes of pivotal motion of the device. The angular range of movement of the device can be made to vary with circumstances; but for most applications, 120° should be adequate. Radiation from the early morning and late evening sun is relatively small, and mid-day is the most important time for tracking the sun accurately. So the device usually need not track the sun accurately all the way to sunset and swing all the way back to aim at the rising sun, although this is possible.

Especially when the device aims short of the setting sun at its western limit of motion against stop 48, a shade 50 can be fixed to base 40 to extend up to a position suitable for casting a shadow on western sensor tube 14 to prevent overheating as tube 14 faces the evening sun. The device also preferably has safety plugs (not shown) arranged to open for any excessive pressure. Otherwise, the device is intended to operate automatically without human intervention or any power source other than sunlight for indefinitely long periods of time.

In operation, as radiation from the rising sun intensifies and falls on eastern sensor tube 13, refrigerant pressure increases against bladder 23 in separator 21, pressurizing the oil in line 25 leading to cylinder 31. Meanwhile, the absence of sunlight on sensor tube 14 causes a lower pressure on bladder 24 and hydraulic line 26 leading to cylinder 32. When the pressure difference between sensor tubes 13 and 14 becomes a large enough, hydraulic material moves through line 25 and orifice 27 to move cylinder 31 and pull cable 41 to turn drum 42 and shaft 43. This pivots both the sensor panels 11 and 12 and collector 45 eastward toward the sun, which may require several minutes because of the restriction of orifice 27.

As the bisector 18 between the orientation angles of sensor panels 11 and 12 approaches the sun, sunlight becomes incident on sensor tube 14 as well as sensor tube 13; and the pressures in both tubes approach equality. This equally pressurizes bladders 23 and 24 in the separators and the hydraulic material thrusting against cylinders 31 and 32 so that by the time aiming plane 18 reaches the sun, the hydraulic system is in equilibrium and stops pivotal motion, leaving the device aimed at the sun for the most efficient reception of energy.

As the sun proceeds westward, it illuminates western tube 14 more than eastern tube 13 and creates an opposite pressure difference increasing the pressure in separator 22 and cylinder 32 to pivot the device westward. Sensor panels 11 and 12 seek equilibrium, because any temperature difference between them causes a hydraulic pressure imbalance that pivots the device in a direction to equalize temperature and thus keeps bisector plane 18 between sensor panels 11 and 12 approximately aimed at the sun during the day. If clouds obscure the sun so that it cannot produce any temperature difference in sensor tubes 13 and 14, the device remains stationary until the sun reappears and falls on one of the sensor tubes. Since solar collector 45 is perpendicular to the aiming plane 18, collector 45 is accurately aimed at the sun to receive maximum incident sunlight.

I claim:

1. A solar powered, solar aiming device pivotally mounted on a base and comprising:
    a. a pair of separate solar sensor tubes insulated from each other and oriented at an angle to each other;
    b. hydraulic means for angularly pivoting said sensor tubes relative to said base;
    c. a pair of hydraulic bladder separators;
    d. hydraulic material communicating with said bladder separators and said hydraulic means;
    e. refrigerant material in each of said sensor tubes communicating respectively with said bladder separators for pressurizing said separators and said hydraulic material as a function of solar energy respectively incident on said sensor tubes; and
    f. said sensor tubes, bladder separators, and hydraulic means being arranged so that when an aiming plane bisecting said angle between said sensor tubes is aimed at an angle from the sun causing said sensor tubes to receive different incident sunlight and reach different temperatures, said refrigerant material applies different pressures to said respective separators which then power said hydraulic means to pivot said sensor tubes to correct the solar aim of said bisector plane; and when said plane is aimed at the sun causing said sensor tubes to reach approximately equal temperatures, said refrigerant material applies approximately equal pressures to said respective separators which then hold said hydraulic means stationary.

2. The device of claim 1 wherein said angle between said sensor tubes is an acute angle.

3. The device of claim 1 including glazing material arranged over said sensor tubes.

4. The device of claim 1 including small orifices restricting movement of said hydraulic material between said separators and said hydraulic means to prevent rapid movement of said hydraulic means.

5. The device of claim 1 including stops for limiting said pivoting of said sensor tubes.

6. The device of claim 1 wherein said hydraulic means includes a pair of cylinders mounted on said base, a cable connected between said cylinders, a rotor mounted to pivot with said sensor tubes, and said cable being wrapped around said rotor so said cylinders operate to turn said rotor and pivot said sensor tubes.

7. The device of claim 1 including a solar energy collector mounted on said base for rotation with said sensor tubes, said solar energy collector being oriented perpendicular to said bisector plane.

8. The device of claim 7 including stops for limiting said pivoting of said sensor tubes and said solar collector.

9. The device of claim 8 including glazing material arranged over said sensor tubes.

10. The device of claim 9 wherein said angle between said sensor tubes is an acute angle.

11. The device of claim 10 including small orifices restricting movement of said hydraulic material between said separators and said hydraulic means to prevent rapid movement of said hydraulic means.

* * * * *